United States Patent
Ray et al.

(10) Patent No.: US 11,416,395 B2
(45) Date of Patent: Aug. 16, 2022

(54) MEMORY VIRTUALIZATION FOR ACCESSING HETEROGENEOUS MEMORY COMPONENTS

(71) Applicant: Micron Technology, Inc., Boise, ID (US)

(72) Inventors: Anirban Ray, Santa Clara, CA (US); Parag R. Maharana, Dublin, CA (US); Gurpreet Anand, Pleasanton, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/054,719

(22) Filed: Aug. 3, 2018

(65) Prior Publication Data

US 2019/0243756 A1    Aug. 8, 2019

Related U.S. Application Data

(60) Provisional application No. 62/626,491, filed on Feb. 5, 2018.

(51) Int. Cl.
*G06F 12/0802* (2016.01)
*G06F 9/50* (2006.01)
(Continued)

(52) U.S. Cl.
CPC ........ *G06F 12/0802* (2013.01); *G06F 9/5077* (2013.01); *G06F 12/0238* (2013.01); *G06F 16/972* (2019.01)

(58) Field of Classification Search
CPC ............. G06F 12/0802; G06F 12/0238; G06F 9/5077; G06F 16/972
See application file for complete search history.

(56) References Cited

U.S. PATENT DOCUMENTS 5,390,334 A * 2/1995 Harrison ................. G06F 12/08
713/324
5,727,150 A    3/1998 Laudon et al.
(Continued)

FOREIGN PATENT DOCUMENTS

KR    20140041408    4/2014
KR    20160116533 A    10/2016

OTHER PUBLICATIONS

International Search Report and Written Opinion, PCT/US2019/015602, dated May 3, 2019.

(Continued)

*Primary Examiner* — Prasith Thammavong
(74) *Attorney, Agent, or Firm* — Greenberg Traurig

(57) ABSTRACT

A computing system having at least one bus, a plurality of different memory components, and a processing device operatively coupled with the plurality of memory components through the at least one bus. The different memory components include first memory and second memory having different memory access speeds. The computing system further includes a memory virtualizer operatively to: store an address map between first addresses used by the processing device to access memory and second addresses used to access the first memory and the second memory; monitor usages of the first memory and the second memory; adjust the address map based on the usages to improve speed of the processing device in memory access involving the first memory and the second memory; and swap data content in the first memory and the second memory according to adjustments to the address map.

17 Claims, 6 Drawing Sheets

(51) Int. Cl.
*G06F 12/02* (2006.01)
*G06F 16/958* (2019.01)

(56) References Cited

U.S. PATENT DOCUMENTS

| | | | |
|---|---|---|---|
| 5,909,540 A | 6/1999 | Carter et al. | |
| 5,918,229 A | 6/1999 | Davis et al. | |
| 6,026,475 A | 2/2000 | Woodman | |
| 6,230,260 B1 | 5/2001 | Luick | |
| 6,247,097 B1 | 6/2001 | Sinharoy | |
| 6,279,138 B1 | 8/2001 | Jadav et al. | |
| 6,473,845 B1 | 10/2002 | Hornung et al. | |
| 7,376,681 B1 | 5/2008 | Todd et al. | |
| 8,082,400 B1* | 12/2011 | Chang | G06F 9/5077 709/213 |
| 8,117,373 B2 | 2/2012 | Berlin | |
| 8,131,814 B1 | 3/2012 | Schlansker et al. | |
| 8,135,933 B2 | 3/2012 | Fisher et al. | |
| 8,316,187 B2 | 11/2012 | Pothireddy | |
| 8,352,709 B1 | 1/2013 | Glasco et al. | |
| 8,560,761 B2* | 10/2013 | Tzeng | G06F 13/4239 710/52 |
| 8,700,724 B2 | 4/2014 | McDaniel et al. | |
| 8,799,554 B1 | 8/2014 | Vincent et al. | |
| 8,825,937 B2 | 9/2014 | Atkisson et al. | |
| 8,838,887 B1 | 9/2014 | Burke et al. | |
| 8,868,842 B2 | 10/2014 | Yano et al. | |
| 8,930,647 B1* | 1/2015 | Smith | G06F 30/392 711/154 |
| 8,965,819 B2 | 2/2015 | Tirunagari | |
| 8,996,834 B2 | 3/2015 | Brenner et al. | |
| 9,043,530 B1 | 5/2015 | Sundaram et al. | |
| 9,047,017 B1 | 6/2015 | Dolan et al. | |
| 9,104,555 B2 | 8/2015 | Liebowitz et al. | |
| 9,122,503 B1 | 9/2015 | Hoff | |
| 9,342,453 B2 | 5/2016 | Naie et al. | |
| 9,535,740 B1 | 1/2017 | Graham et al. | |
| 9,619,408 B2 | 4/2017 | Naie et al. | |
| 9,817,739 B1 | 11/2017 | Pise et al. | |
| 9,910,618 B1 | 3/2018 | Curley et al. | |
| 9,996,370 B1 | 6/2018 | Khafizov et al. | |
| 10,120,797 B1 | 11/2018 | Foley et al. | |
| 10,223,371 B2 | 3/2019 | Thirumal | |
| 10,241,943 B2 | 3/2019 | Nale et al. | |
| 10,282,322 B2 | 5/2019 | Nale et al. | |
| 10,282,323 B2 | 5/2019 | Nale et al. | |
| 10,289,566 B1 | 5/2019 | Dalmatov et al. | |
| 10,298,496 B1 | 5/2019 | Nakibly et al. | |
| 10,394,789 B1 | 8/2019 | Animesh et al. | |
| 10,430,723 B1 | 10/2019 | Tzur et al. | |
| 10,514,855 B2 | 12/2019 | Voigt | |
| 10,725,663 B2 | 7/2020 | Awasthi et al. | |
| 10,782,908 B2 | 9/2020 | Mittal et al. | |
| 10,852,949 B2 | 12/2020 | Frolikov et al. | |
| 10,877,892 B2 | 12/2020 | Ray et al. | |
| 10,880,401 B2 | 12/2020 | Maharana et al. | |
| 11,099,789 B2 | 8/2021 | Maharana et al. | |
| 2002/0145919 A1 | 10/2002 | Lamb et al. | |
| 2002/0196659 A1* | 12/2002 | Hurst | G11C 17/16 365/175 |
| 2003/0126232 A1 | 7/2003 | Mogul et al. | |
| 2004/0186960 A1 | 9/2004 | Poggio | |
| 2006/0087893 A1 | 4/2006 | Nishihara et al. | |
| 2006/0095679 A1 | 5/2006 | Edirisooriya | |
| 2006/0206658 A1* | 9/2006 | Hendel | G06F 9/544 711/6 |
| 2007/0033367 A1* | 2/2007 | Sakarda | G06F 12/0891 711/170 |
| 2007/0074093 A1 | 3/2007 | Lasser | |
| 2007/0112864 A1 | 5/2007 | Ben-Natan | |
| 2008/0016297 A1 | 1/2008 | Bartley et al. | |
| 2009/0113422 A1* | 4/2009 | Kani | G06F 9/5077 718/1 |
| 2009/0150639 A1 | 6/2009 | Ohata | |
| 2010/0011169 A1 | 1/2010 | Pothireddy | |
| 2010/0082899 A1 | 4/2010 | Nakajima et al. | |
| 2010/0281230 A1 | 11/2010 | Rabii et al. | |
| 2010/0293412 A1 | 11/2010 | Sakaguchi et al. | |
| 2011/0161554 A1 | 6/2011 | Selinger et al. | |
| 2011/0231857 A1 | 9/2011 | Zaroo et al. | |
| 2011/0238887 A1* | 9/2011 | Bazzani | G06F 3/0685 711/103 |
| 2011/0238899 A1 | 9/2011 | Yano et al. | |
| 2012/0047312 A1* | 2/2012 | Nathuji | G06F 9/3832 711/6 |
| 2012/0054419 A1 | 3/2012 | Chen et al. | |
| 2012/0084497 A1 | 4/2012 | Subramaniam et al. | |
| 2012/0117304 A1 | 5/2012 | Worthington et al. | |
| 2012/0124572 A1 | 5/2012 | Cunningham et al. | |
| 2012/0246403 A1 | 9/2012 | Mchale et al. | |
| 2012/0297121 A1 | 11/2012 | Gorobets et al. | |
| 2012/0297122 A1 | 11/2012 | Gorobets et al. | |
| 2013/0024609 A1 | 1/2013 | Gorobets et al. | |
| 2013/0111113 A1 | 5/2013 | Harari et al. | |
| 2013/0124811 A1 | 5/2013 | Hamilton et al. | |
| 2013/0145095 A1 | 6/2013 | McKean et al. | |
| 2013/0151761 A1 | 6/2013 | Kim et al. | |
| 2013/0152086 A1* | 6/2013 | Yoo | G06F 9/455 718/1 |
| 2013/0179632 A1 | 7/2013 | Ben-shemesh et al. | |
| 2013/0226837 A1 | 8/2013 | Lymberopoulos et al. | |
| 2014/0006740 A1 | 1/2014 | Tokusho et al. | |
| 2014/0032818 A1 | 1/2014 | Chang et al. | |
| 2014/0040550 A1 | 2/2014 | Bill et al. | |
| 2014/0089631 A1* | 3/2014 | King | G06F 12/1027 711/207 |
| 2015/0016046 A1 | 1/2015 | Shaeffer | |
| 2015/0026509 A1 | 1/2015 | Zhang et al. | |
| 2015/0032921 A1 | 1/2015 | Malkin | |
| 2015/0067087 A1 | 3/2015 | Guerin et al. | |
| 2015/0082062 A1 | 3/2015 | Saraswat et al. | |
| 2015/0097851 A1 | 4/2015 | Anderson et al. | |
| 2015/0106656 A1 | 4/2015 | Bian et al. | |
| 2015/0134927 A1 | 5/2015 | Varanasi | |
| 2015/0160858 A1* | 6/2015 | Okada | G06F 3/061 711/114 |
| 2015/0169238 A1 | 6/2015 | Lee et al. | |
| 2015/0199276 A1 | 7/2015 | Radhakrishnan et al. | |
| 2015/0212741 A1 | 7/2015 | Lee et al. | |
| 2015/0227465 A1 | 8/2015 | Sundaram et al. | |
| 2015/0268875 A1 | 9/2015 | Jeddeloh | |
| 2015/0278091 A1 | 10/2015 | Wilkerson et al. | |
| 2015/0356125 A1 | 12/2015 | Golander et al. | |
| 2016/0042005 A1 | 2/2016 | Liu et al. | |
| 2016/0054922 A1 | 2/2016 | Awasthi et al. | |
| 2016/0125048 A1 | 5/2016 | Hamada | |
| 2016/0188218 A1 | 6/2016 | Gray et al. | |
| 2016/0188700 A1 | 6/2016 | Kleinschnitz, Jr et al. | |
| 2016/0210167 A1 | 7/2016 | Bolic et al. | |
| 2016/0210251 A1 | 7/2016 | Nale et al. | |
| 2016/0210465 A1 | 7/2016 | Craske et al. | |
| 2016/0212214 A1 | 7/2016 | Rahman et al. | |
| 2016/0253263 A1* | 9/2016 | Takada | G06F 12/0871 711/119 |
| 2016/0294710 A1 | 10/2016 | Sreeramoju | |
| 2016/0306557 A1* | 10/2016 | Koseki | G06F 3/0616 |
| 2016/0350236 A1 | 12/2016 | Tsirkin et al. | |
| 2016/0371014 A1 | 12/2016 | Roberts | |
| 2017/0039164 A1 | 2/2017 | Ioannou et al. | |
| 2017/0060754 A1 | 3/2017 | Nakra et al. | |
| 2017/0123796 A1 | 5/2017 | Kumar et al. | |
| 2017/0131902 A1 | 5/2017 | Goss et al. | |
| 2017/0147427 A1 | 5/2017 | Nero | |
| 2017/0177486 A1 | 6/2017 | Horn | |
| 2017/0199666 A1 | 7/2017 | Sundaram et al. | |
| 2017/0249266 A1 | 8/2017 | Nale et al. | |
| 2017/0255383 A1 | 9/2017 | Chang et al. | |
| 2017/0262215 A1* | 9/2017 | Banerjee | G06F 9/45558 |
| 2017/0285967 A1 | 10/2017 | Pandurangan et al. | |
| 2017/0285992 A1 | 10/2017 | Vogt | |
| 2017/0302734 A1 | 10/2017 | Liang et al. | |
| 2017/0316321 A1 | 11/2017 | Whitney et al. | |
| 2017/0364422 A1* | 12/2017 | Antony | G06F 11/203 |
| 2017/0364450 A1 | 12/2017 | Struttmann | |

(56) References Cited

U.S. PATENT DOCUMENTS

| | | | |
|---|---|---|---|
| 2018/0004441 | A1 | 1/2018 | Takamura et al. |
| 2018/0011790 | A1 | 1/2018 | Gaur et al. |
| 2018/0018379 | A1* | 1/2018 | Eda .................. G06F 16/185 |
| 2018/0024853 | A1 | 1/2018 | Warfield et al. |
| 2018/0046581 | A1* | 2/2018 | Banerjee ............ G06F 12/1009 |
| 2018/0089087 | A1 | 3/2018 | Chang et al. |
| 2018/0121366 | A1 | 5/2018 | Tian |
| 2018/0150219 | A1* | 5/2018 | Chen .................. G06F 3/061 |
| 2018/0189207 | A1 | 7/2018 | Bill et al. |
| 2018/0260135 | A1 | 9/2018 | Hayashida et al. |
| 2018/0293163 | A1 | 10/2018 | Bergeron |
| 2018/0316569 | A1 | 11/2018 | Ciltone et al. |
| 2018/0332366 | A1 | 11/2018 | Paduroiu |
| 2019/0004841 | A1 | 1/2019 | Starks |
| 2019/0018809 | A1 | 1/2019 | Nale et al. |
| 2019/0079689 | A1 | 3/2019 | Cherubini et al. |
| 2019/0129834 | A1 | 5/2019 | Purkayastha et al. |
| 2019/0129847 | A1 | 5/2019 | Roh |
| 2019/0179760 | A1 | 6/2019 | Bhargava et al. |
| 2019/0196996 | A1 | 6/2019 | Balakrishnan et al. |
| 2019/0243552 | A1 | 8/2019 | Maharana et al. |
| 2019/0243570 | A1 | 8/2019 | Mittal et al. |
| 2019/0243771 | A1 | 8/2019 | Mittal et al. |
| 2019/0243787 | A1 | 8/2019 | Mittal et al. |
| 2019/0253520 | A1 | 8/2019 | Maharana et al. |
| 2019/0310780 | A1* | 10/2019 | Gholamipour ........ G06F 3/0679 |
| 2019/0332556 | A1 | 10/2019 | Nale et al. |
| 2020/0019506 | A1 | 1/2020 | Ray et al. |
| 2020/0073827 | A1 | 3/2020 | Wallach |
| 2020/0074094 | A1 | 3/2020 | Wallach |
| 2020/0319813 | A1 | 10/2020 | Mittal et al. |
| 2020/0326851 | A1 | 10/2020 | Frolikov et al. |
| 2021/0034524 | A1 | 2/2021 | Leidel et al. |
| 2021/0048947 | A1 | 2/2021 | Frolikov et al. |
| 2021/0117326 | A1 | 4/2021 | Ray et al. |
| 2021/0120099 | A1 | 4/2021 | Maharana et al. |
| 2021/0349638 | A1 | 11/2021 | Maharana et al. |

OTHER PUBLICATIONS

International Search Report and Written Opinion, PCT/US2019/014205, dated May 1, 2019.
International Search Report and Written Opinion, PCT/US2019/014285, dated May 8, 2019.
International Search Report, PCT/US2019/040413, dated Oct. 25, 2019.
Jeff Hawkins et al., "Sequence memory for prediction, inference and behaviour", In: Philosophical Transactions of the Royal Society B: Biological Sciences, pp. 1203-1209, May 1, 2009.
A. Romanow, J. Mogul, T. Talpey, S. Bailey, "Remote Direct Memory Access (RDMA) over IP Problem Statement", RFC 4297, Dec. 2005 (https://www.rfc-editor.org/search/rfc_search_detail.php).
International Search Report and Written Opinion, PCT/US2019/013841, dated Apr. 23, 2019.
International Search Report and Written Opinion, PCT/US2019/013836, dated Apr. 22, 2019.
Predictive Data Orchestration in Multi-tier Memory Systems U.S. Appl. No. 16/054,819, filed Aug. 3, 2018, Samir Miettal, et al.
Memory Systems Having Controllers Embedded in Packages of Integrated Circuit Memory U.S. Appl. No. 16/162,905, filed Oct. 17, 2018, Samir Mittal, et al.
Accelerate Data Access in Memory Systems Via Data Stream Segregation U.S. Appl. No. 16/166,624, filed Oct. 22, 2018 Samir Mittal, et al.
Remote Direct Memory Access in Multi-tier Memory Systems U.S. Appl. No. 16/107,624, filed Aug. 21, 2018 Parag Maharana, et al.
Optimization of Data Access and Communication in Memory Systems U.S. Appl. No. 16/183,234, filed Nov. 7, 2018 Parag Maharana, et al.
Predictive Paging to Accelerate Memory Access U.S. Appl. No. 16/032,331, filed Jul. 11, 2018 Anirban Ray, et al.
"Solid-State Drive", Wikipedia, printed on Mar. 14, 2018.
"Write combining," Wikipedia encyclopedia entry located at https://en.wikipedia.org/wiki/Write_combining, Feb. 12, 2018.
Demand paging, Wikipedia, printed on Apr. 18, 2018.
Device driver, Wikipedia, printed on Apr. 19, 2018.
Garbage collection (computer science), Wikipedia, printed on Sep. 26, 2018.
Graphics processing unit, Wikipedia, printed on Jul. 26, 2018.
Hypervisor, Wikipedia, printed on Apr. 19, 2018.
Infiniband, Wikipedia, printed on Jul. 26, 2018.
Integrated circuit, Wikipedia, printed on Sep. 24, 2018.
Interlaken (networking), Wikipedia, printed on Sep. 21, 2018.
Message Passing Interface, Wikipedia, printed on Jul. 26, 2018.
Microsequencer, Wikipedia, printed on Sep. 21, 2018.
Operating system, Wikipedia, printed on Apr. 18, 2018.
PCI Express, Wikipedia, printed on Sep. 21, 2018.
Page cache, Wikipedia, printed on Apr. 18, 2018.
Page replacement algorithm, Wikipedia, printed on Jul. 31, 2018.
Page table, Wikipedia, printed on Jul. 31, 2018.
Paging, Wikipedia, printed on Apr. 18, 2018.
RAM drive, Wikipedia, printed on Apr. 18, 2018.
SerDes, Wikipedia, printed on Sep. 21, 2018.
Switched fabric, Wikipedia, printed on Jul. 26, 2018.
Translation lookaside buffer, Wikipedia, printed on Apr. 18, 2018.
Virtual memory, Wikipedia, printed on Apr. 18, 2018.
Mmap, Wikipedia, printed on Apr. 18, 2018.
International Search Report and Written Opinion, PCT/US2020/021825, dated Jul. 6, 2020.
Cai, "Error Characterization, Mitigation and Recovery", 2017.
International Search Report and Written Opinion, PCT/US2019/014275, dated May 8, 2019.
Oracle, "NFS Over ROMA", Retrieved on Feb. 18, 2020 from https://web.archive.org/web/20150920225910/https://docs.oracle.com/cd/E23824_01/html/821-1454/rfsrefer-154.html# (Year: 2015).
Vatto, "Analyzing Intel-Micron 3D XPoint: The NextGeneration Non-Volatile Memory", 2015.
Abhijith, et al. "The Efficient Use of Storage Resources in SAN for Storage Tiering and Caching," 2015 International Conference on Computational Intelligence and Networks, IEEE, Jan. 11, 2016.
Extended European Search Report, EP19746665.9, dated May 3, 2021.
Extended European Search Report, EP19746836.6, dated May 19, 2021.
Extended European Search Report, EP19748086.6, dated Jun. 8, 2021.
Extended European Search Report, EP19746972.9, dated May 19, 2021.
Jacob, et al. "Optimized utilization of disks in storage area network by storage tiering," 2017 International Conference an Computing, Communication, and Automation 9ICCCA), IEEE, May 5, 2017.
Salkhordeh, et al. "Operating system level data tiering using online workload characterization," Journal of Supercomputing, Kluwer Academic Publishers, Jan. 31, 2015.
Extended European Search Report, EP19747107.1, dated Apr. 30, 2021.
Handy, Jim. "Where does NVRAM Fit?" Objective Analysis, Aug. 15, 2014.
Kalnoskas, Aimee. "SSD controllers integrate DDR4 DRAM on chip." Microsemi, Aug. 5, 2016.
Wilson, Tracy. "How PCI Express Works." Retrieved from the Internet <https://computer.howstuffworks.com/pci-express.htm>, Mar. 30, 2021.
Extended European Search Report, EP19833924.4, dated Mar. 18, 2022.
Palmer, Mark, et al. "Fido: A Cache That Learns to Fetch." Proceedings of the 17th International Conference on Very Large Data Bases, Sep. 1991.
Ppeled, Leeor, et al. "A neural network memory prefetcher using semantic locality." arXiv:1804.00478v2, Jul. 26, 2018.

\* cited by examiner

MEMORY VIRTUALIZATION FOR ACCESSING HETEROGENEOUS MEMORY COMPONENTS

RELATED APPLICATIONS

The present application claims the benefit of the filing date of Prov. U.S. Pat. App. Ser. No. 62/626,491, filed on Feb. 5, 2018 and entitled "Memory Virtualization for Two Tier Memory Systems," the entire disclosure of which is hereby incorporated herein by reference.

The present application relates to U.S. patent application Ser. No. 16/032,331, filed Jul. 11, 2018 and entitled "Predictive Paging to Accelerate Memory Access," and U.S. patent application Ser. No. 16/035,469, filed Jul. 13, 2018 and entitled "Isolated Performance Domains in a Memory System," the entire disclosures of which applications are hereby incorporated herein by reference.

FIELD OF THE TECHNOLOGY

At least some embodiments disclosed herein relate to memory systems in general, and more particularly, but not limited to memory virtualization for accessing heterogeneous memory components.

BACKGROUND

A memory sub-system can be a memory module, such as a dual in-line memory module (DIMM), a small outline DIMM (SO-DIMM), or a non-volatile dual in-line memory module (NVDIMM). A memory sub-system can be a storage system, such as a solid-state drive (SSD), or a hard disk drive (HDD). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

An operating system of a computer system can allow an application program to use virtual addresses of memory to store data in, or retrieve data from, memory components of one or more memory sub-systems of the computer system. The operating system maps the virtual addresses to physical addresses of one or more memory sub-systems connected to the central processing unit (CPU) of the computer system. The operating system implements the memory accesses specified at virtual addresses using the physical addresses of the memory sub-systems.

A virtual address space can be divided into pages. A page of virtual memory can be mapped to a page of physical memory in the memory sub-systems. The operating system can use a paging technique to access a page of memory in a storage device via a page of memory in a memory module. At different time instances, the same page of memory in a memory module can be used as proxy to access different pages of memory in the storage device or another storage device in the computer system.

A computer system can include a hypervisor (or virtual machine monitor) to create or provision virtual machines. A virtual machine is a computing device that is virtually implemented using the resources and services available in the computer system. The hypervisor presents the virtual machine to an operating system as if the components of virtual machine were dedicated physical components. A guest operating system runs in the virtual machine to manage resources and services available in the virtual machine, in a way similar to the host operating system running in the computer system. The hypervisor allows multiple virtual machines to share the resources of the computer system and allows the virtual machines to operate on the computer substantially independently from each other.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a memory virtualization technique that can improve memory access performance in a computer system having heterogeneous memory components. A memory sub-system is also hereinafter referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

A memory sub-system can have different types of memory components that offer different advantages in different aspects. For example, a memory module can have volatile DRAM for fast access and non-volatile memory for persistent storage. However, it is a challenge for applications to program the usages of the different types of memory components for full utilization of the different advantages offered by different types of memory components.

At least some aspects of the present disclosure address the above and other deficiencies by virtualizing memory access to the different types of memory components such that the differences in the memory components are shielded from the applications. Memory accesses to the different types of memory components are made through a memory device driver. Based on the current and/or past memory usage patterns, the device drive adjusts what data is stored in what memory components to improve the performance of the memory sub-system as a whole for a current time period. The device drive automatically manages the usage of the different types of memory components based on past or current usage patterns and/or predicted usage patterns, such that the different advantages of the different types of memory components can be fully utilizes.

Figure 1:
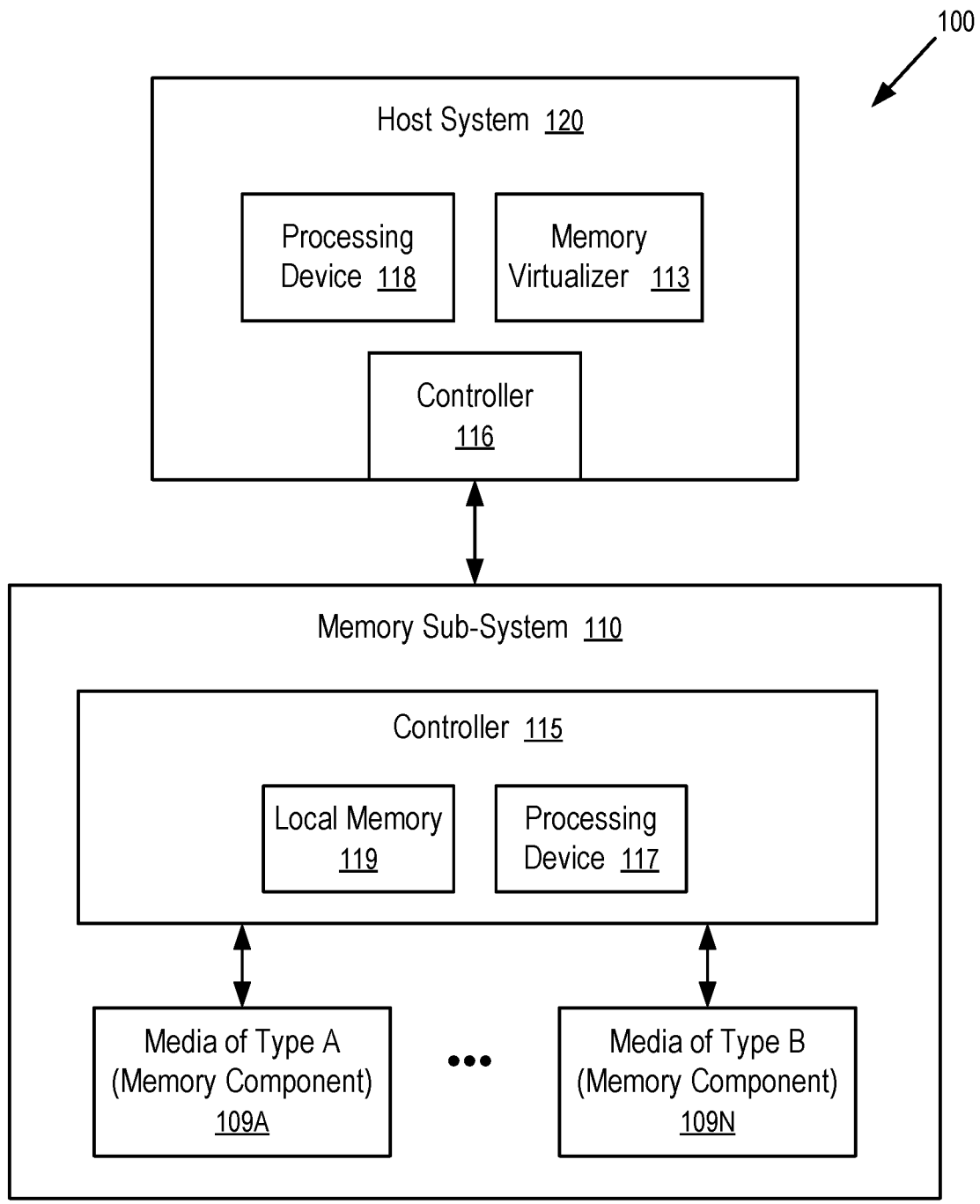
FIG. 1 illustrates an example computing system having a memory sub-system in accordance with some embodiments of the present disclosure.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The computing system 100 includes a memory virtualizer 113 in the host system 120 that can virtualize memory access to the memory components 109A to 109N by shielding the differences in the memory components 109A to 109N from applications running in the processing device 118. In some embodiments, the controller 116 and/or the processing device 118 in the host system 120 includes at least a portion of the memory virtualizer 113. For example, the controller 116 and/or the processing device 118 can include logic circuitry implementing the memory virtualizer 113. For example, the processing device 118 (processor) of the host system 120 can be configured to execute instructions stored in memory for performing the operations of the memory virtualizer 113 described herein. In some embodiments, the memory virtualizer 113 is part of an operating system of the host system 120, a device driver, or an application. Optionally, the memory virtualizer 113 can be implemented partially, or entirely, in the controller 115 of the memory sub-system 110.

The memory virtualizer 113 offers to access the memory components 109A to 109N using a set of virtualized memory addresses. Some of the virtualized memory addresses are used to access one type of memory components (e.g., faster but volatile memory 109A); and some of the virtualized memory addresses are used to access another type of memory components (e.g., non-volatile but slower memory 109N). However, there is no predetermined association between groups of virtualized memory addresses and the different types of memory components 109A to 109N. The memory virtualizer 113 can adjust the mapping between the virtualized memory addresses and the different types of memory components 109A to 109N dynamically to fully utilizes the different advantages offered by the different types of memory components. For example, a predictive model can be trained in predicting hot pages of virtual memory that will be used soon and cold pages of virtual memory that will not be used for a period of time. Based on the prediction, the memory virtualizer 113 automatically adjusts the mapping and instructs the controller 115 of the memory sub-system 110 to swap the hot pages to the faster memory (e.g., 109A) and swap the cold pages to the slower memory (e.g., 109N). The page swapping can be performed by the controller 115 within the memory sub-system 110 without utilizing the communication bandwidth on the connection between the memory sub-system 110 and the host system 120. After the mapping adjustment and page swapping, the memory access performance of the memory subsystem 110 for the predicted memory usage is improved. The memory virtualizer 113 shields the memory differences from applications. Thus, the applications running in the processing device 118 can make memory access requests as if the memory components 109A to 109N were a pool of uniform virtual memory having the same characteristics. The memory virtualizer 113 dynamically adjusts the data distribution in the memory components 109A to 109N to utilize the advantages offered by the different types of memory components 109A to 109N. Further details with regards to the operations of the memory virtualizer 113 are described below.

In one example, the central processing unit (CPU) can access two sets of memory provided in one or more memory sub-systems connected to the CPU. For example, one set of memory can be slower than the other set of memory; and the central processing unit (CPU) uses the memory virtualizer 113 to access the slower set of memory via the faster set of memory using a paging technique. In some instances, one set of memory cannot be directly addressable by the CPU and is coupled to the other set of memory that is directly addressable by the CPU; and the central processing unit (CPU) uses the memory virtualizer 113 to access a set of memory that is not directly addressable via the set of memory that is directly addressable in a way similar to the use of the paging technique.

For example, when a page of virtual memory being accessed is currently in the slower set of memory but not in the faster set of memory, a page can be allocated from the faster set of memory to service the page in the slower set of memory; and the memory virtualizer 113 is to fetch the data of the page from the slower set of memory, store the fetched page of data in the allocated page in the faster set of memory, such that the data access of the page of the virtual memory can be made via accessing the allocated page in the faster set of memory in subsequent operations. In some instances, swapping a page takes a time period longer than simply accessing a requested data element from the slower memory. Thus, the requested data element is first serviced to the requester, while the page swapping is performed to speed up subsequent access to the data elements in the hot page. Using such an approach, the overall performance can be better than holding the request for the data element until the page swap is completed.

Further, the memory virtualizer 113 can receive information related to the use of the pages in the slower set of memory, and train a self-learning prediction engine to predict the use of the pages based on such information. For example, a supervised machine learning technique can be used to train, using the information, an artificial neural network to predict the use of the pages in the slower set of memory by reducing the errors between predictions and the actual use of the pages. After the training of the artificial neural network, the prediction engine can use the current information to predict the next pages to be used. Further, the training, prediction, and feedback from the actual usage following the prediction for further training can be performed in a continuous fashion to adapt the prediction model of the artificial neural network to the most recent usage patterns of memory pages.

In response to the memory usage prediction, made based on the trained artificial neural network and the current information, that a page in the slower set of memory is to be used soon, the memory virtualizer 113 can instruct the controller 115 to proactively swap the page of data from the slower set of memory to the faster set of memory, such that when needed for processing, the page of data is already in the faster set of memory, which arrangement improves the data access speed of the page of data.

The accuracy of the prediction can be measured against the subsequent actual page use; and the prediction and the subsequent actual page use can be used to further train or adjust the artificial neural network to track the most recent usage patterns of memory pages.

Alternatively, or in combination, the machine learning-based prediction can be replaced or augmented with policy based prediction rules. For example, pages storing resident codes (e.g., in lower addresses) can be maintained in the faster set of memory when possible to reduce swapping of frequently used pages. For example, a huge page can be loaded into the faster set of memory when a page that is a portion of the huge page is being accessed. For example, predictions can be made at least in part using heuristic rules, based on indications such as whether the pages are accessed sequentially or randomly, whether the data access is in a steady state mode or in a bursty mode, and/or the logical relations between pages (and pages of different sizes).

Some details and examples regarding the prediction techniques can be found in U.S. patent application Ser. No. 16/032,331, filed Jul. 11, 2018 and entitled "Predictive Paging to Accelerate Memory Access".

Figure 2:
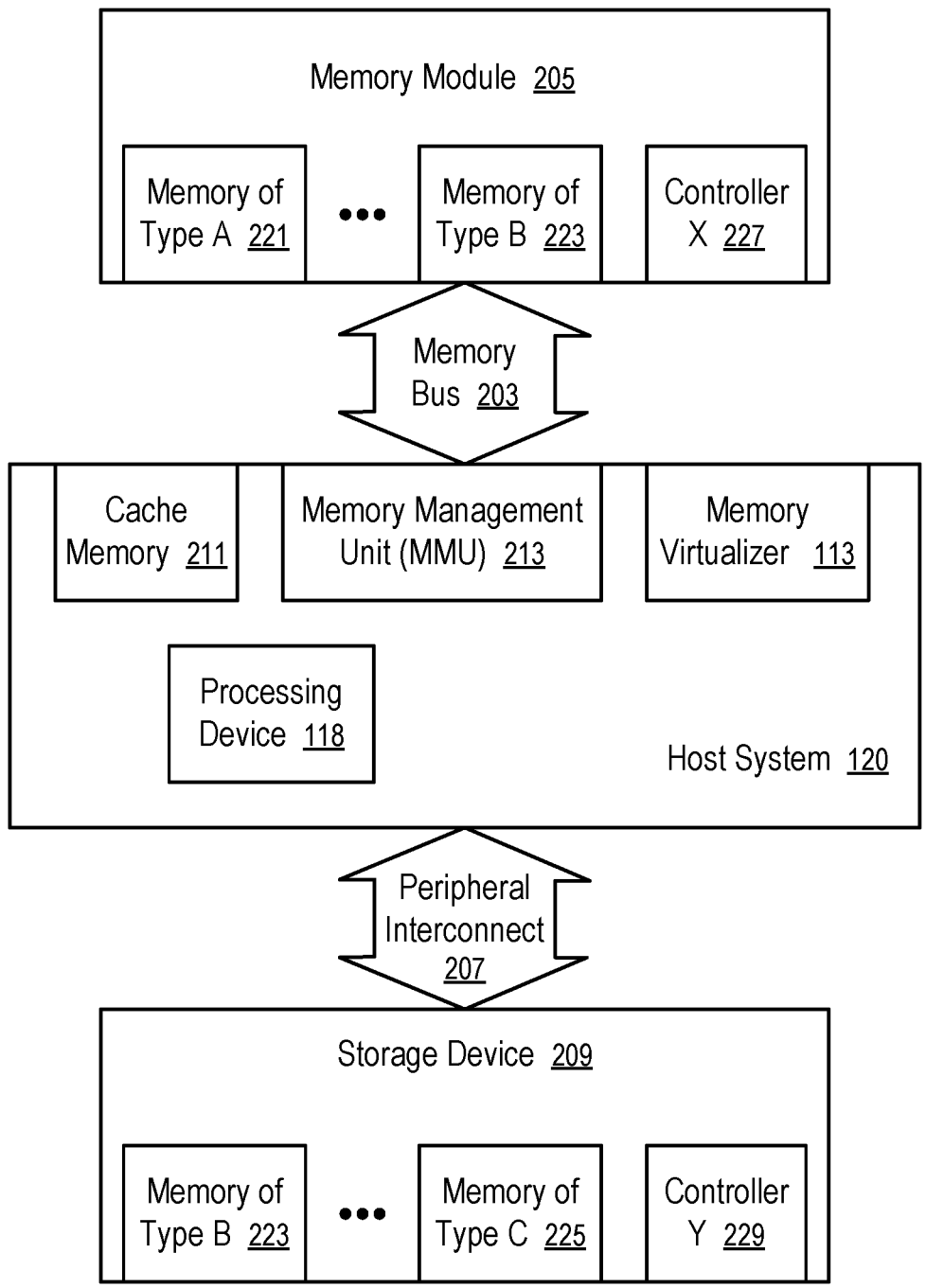
FIG. 2 shows a computing system having different types of memory and running instructions to virtualize memory access in accordance with at least some embodiments disclosed herein.

FIG. 2 shows a computing system having different types of memory and running instructions to virtualize memory access in accordance with at least some embodiments disclosed herein.

The computing system of FIG. 2 includes a host system 120, a memory module 205 connected to the host system 120 via a memory bus 203, and a storage device 209 connected to the host system 120 via a peripheral interconnect 207. The storage device 209 and the memory module 205 are examples of the memory sub-system 110 illustrated in FIG. 1.

The host system 120 has a processing device 118, which can be a central processing unit or a microprocessor with one or more processing cores. The host system 120 can have a memory management unit 213 and cache memory 211. The memory management unit 213 and/or at least a portion of the cache memory 211 can be optionally integrated within the same integrated circuit package of the processing device 118.

The memory module 205 illustrated in FIG. 2 has multiple types of memory (e.g., 221 and 223). For example, memory of type A 221 is faster than memory of type B 223.

The memory bus 203 typically operates at a speed faster than the peripheral interconnect 207. For example, the memory bus 203 can be a double data rate bus; and the peripheral interconnect 207 can be a peripheral component interconnect express (PCIe) bus, a serial advanced technology attachment (SATA) bus, a universal serial bus (USB) bus, and/or a storage area network. Memory of type B 223 in the memory module 205 can be accessed at a speed faster than accessing memory of type B 223 in the storage device 209.

The storage device 209 illustrated in FIG. 2 has multiple types of memory (e.g., 223 and 225). For example, memory of type B 223 is faster than memory of type C 225.

In general, a plurality of memory modules (e.g., 205) can be coupled to the memory bus 203; and a plurality of storage devices (e.g., 209) can be coupled to the peripheral interconnect 207. In some instances, the peripheral interconnect 207 and the storage devices (e.g., 209) are optional and can be absent from the computing system. In other instances, the memory bus 203 and the memory modules (e.g., 205) can be optional and can be absent from the computing system.

In a possible configuration when a plurality of memory modules (e.g., 205) are coupled to the memory bus 203, one of the memory modules (e.g., 205) has memory of type A 221; and another of the memory modules has memory of type B 223 that is accessible at a speed lower than the memory of type A 221 in a separate memory module (e.g., 205).

Similarly, in a possible configuration when a plurality of storage devices (e.g., 209) are coupled to the peripheral interconnect 207, one of the storage device (e.g., 209) has memory of type B 223, and another of the storage devices has memory of type C 225 that is accessible at a speed lower than the memory of type B 223 in a separate storage device (e.g., 209).

The processing device 118 and/or the MMU 213 are configured via instructions (e.g., an operating system and/or one or more device drivers) to access a portion of memory in the computer system via another portion of memory in the computer system using a paging technique and/or a memory map interface.

For example, memory of type B 223 of the memory module 205 can be accessed via memory of type A 221 of the memory module 205 (or another memory module).

For example, memory of type B 223 of the storage device 207 can be accessed via memory of type A 221 of the memory module 205 and/or via memory of type B 223 of the memory module 205.

For example, memory of type C 225 of the storage device 207 can be accessed via memory of type A 221 of the memory module 205, via memory of type B 223 of the memory module 205, and/or via memory of type B 223 of the storage device 207 (or another storage device).

For example, in some instances, memory of type A 221 and memory of type B 223 in the same memory module 205 (or different memory modules) are addressable directly and separately over the memory bus 203 by the memory management unit 213 of the processing device 118. However, since the memory of type B 223 is slower than memory of type A 221, it is desirable to access the memory of type B 223 via the memory of type A 221.

In other instances, memory of type B 223 of the memory module 205 is accessible only through addressing the memory of type A 221 of the memory module 205 (e.g., due to the size restriction in the address portion of the memory bus 203).

A controller X 227 can be provided in the memory module 205 to manage data transfer between the memory of type A 221 and the memory of type B 223 within the memory module 205, especially when the memory of type B 223 of the memory module 205 is not directly addressable using the memory bus 203.

In one variation, the memory (e.g., 221 and 223) of the memory module 205 can have the same performance individually within the memory module 205; however, the memory management unit 213 and/or the processing device 118 are restricted to access via the memory 223 via the memory 221 (e.g., due to the size restriction in the address portion of the memory bus 203). Thus, the memory 223 appears to be slower than the memory 221 to the processing device 118.

In general, the memory sub-systems (e.g., 205 and 209) can include media, such as memory (e.g., 221, ..., 223, ..., 225). The memory (e.g., 221, ..., 223, ..., 225) can includes volatile memory, non-volatile memory (NVM), and/or a combination of such. In some embodiments, the computer system includes at least one memory sub-system that is a storage device 209. An example of a storage device 209 is a solid-state drive (SSD). In some embodiments, the computer system includes at least one memory sub-system that is a hybrid memory/storage system configured as a memory module 205. The processing device 118 can write data to each of the memory sub-systems (e.g., 205 and 209) and read data from the memory sub-systems (e.g., 205 and 209) directly or indirectly.

The computing system of FIG. 2 can be used to implement a desktop computer, laptop computer, network server, mobile device, or such computing device that includes a memory and a processing device. The processing device 118 can read data from or write data to the memory sub-systems (e.g., 205 and 209).

The processing device 118 can be coupled to a memory sub-system (e.g., 209) via one or more physical interface (e.g., 203, 207).

As used herein, "coupled to" generally refers to a connection between components, which can be an indirect communicative connection or direct communicative connection (e.g., without intervening components), whether wired or wireless, including connections such as, electrical, optical, magnetic, etc.

Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc.

The physical host interface can be used to transmit data between the processing device 118 and the memory sub-system (e.g., 209). The computer system can further utilize an NVM Express (NVMe) interface to access the memory (e.g., 223, ..., 225) when the memory sub-system 209 is coupled with the peripheral interconnect 207 via the PCIe interface. The physical host interface can provide an interface for passing control, address, data, and other signals between the memory sub-system (e.g., 209) and the processing device 118.

In general, a memory sub-system (e.g., 205 and 209) includes a printed circuit board that connects a set of memory devices, such as memory integrated circuits, that provides the memory (e.g., 221, ..., 223, ..., 225). The memory (e.g., 221, ..., 223, ..., 225) on the memory sub-system (e.g., 205 and 209) can include any combination of the different types of non-volatile memory devices and/or volatile memory devices.

An example of non-volatile memory devices includes a negative-and (NAND) type flash memory or a negative-or (NOR) type flash memory. A memory integrated circuit can include one or more arrays of memory cells, such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system 120. Although non-volatile memory devices such as NAND type flash memory are described, the memory integrated circuits can be based on any other type of memory such as a volatile memory. In some implementations, the memory (e.g., 221, ..., 223, ..., 225) can include, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and/or a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices can be grouped as memory pages or data blocks that can refer to a unit of the memory device used to store data.

A memory sub-system (e.g., 205 or 209) can have a controller (e.g., 227 or 229) that communicate with the memory (e.g., 221, ..., 223, ..., 225) to perform operations such as reading data, writing data, or erasing data in the memory (e.g., 221, ..., 223, ..., 225) and other such operations, in response to requests, commands or instructions from the processing device 118 and/or the memory management unit (MMU) 213. The controller (e.g., 227 or 229) can include hardware such as one or more integrated circuits and/or discrete components, a buffer memory, or a combination thereof. The controller (e.g., 227 or 229) can be a microcontroller, special purpose logic circuitry (e.g., a field programmable gate array (FPGA), an application specific integrated circuit (ASIC), etc.), or another suitable processor. The controller (e.g., 227 or 229) can include one or more processors (processing devices) configured to execute instructions stored in local memory.

The local memory of the controller (e.g., 227 or 229) can include an embedded memory configured to store instructions for performing various processes, operations, logic flows, and routines that control operation of the memory sub-system (e.g., 205 or 209), including handling communications between the memory sub-system (e.g., 205 or 209) and the processing device 118/MMU 213, and other functions described in greater detail below. The local memory 119 of the controller (e.g., 227 or 229) can include read-only memory (ROM) for storing While the example memory sub-systems (e.g., 205 and 209) in FIG. 2 have been illustrated as including controllers (e.g., 227 and 229), in another embodiment of the present disclosure, a memory sub-system (e.g., 205 or 209) may not include a controller (e.g., 227 or 229), and can instead rely upon external control (e.g., provided by the MMU 213, or by a processor or controller separate from the memory sub-system (e.g., 205 or 209)).

In general, the controller (e.g., 227 or 229) can receive commands, requests or instructions from the processing device 118 or MMU 213 in accordance with a standard communication protocol for the communication channel (e.g., 203 or 207) and can convert the commands, requests or instructions in compliance with the standard protocol into detailed instructions or appropriate commands within the memory sub-system (e.g., 205 or 209) to achieve the desired access to the memory (e.g., 221, ..., 223, ..., 225). For example, the controller (e.g., 227 or 229) can be responsible for operations such as wear leveling operations, garbage collection operations, error detection and error-correcting code (ECC) operations, encryption operations, caching operations, and address translations between a logical block address and a physical block address that are associated with the memory (e.g., 221, ..., 223, ..., 225). The controller (e.g., 227 or 229) can further include host interface circuitry to communicate with the processing device 118 via the physical host interface. The host interface circuitry can convert the commands received from the processing device 118 into command instructions to access the memory devices (e.g., 221, ..., 223, ..., 225) as well as convert responses associated with the memory devices (e.g., 221, ..., 223, ..., 225) into information for the processing device 118.

The memory sub-system (e.g., 205 or 209) can also include additional circuitry or components that are not illustrated. In some implementations, the memory sub-system (e.g., 205 or 209) can include a cache or buffer (e.g., DRAM) and address circuitry (e.g., a row decoder and a column decoder) that can receive an address from the controller (e.g., 227 or 229) or the MMU 213 and decode the address to access the memory (e.g., 221, ..., 223, ..., 225).

In one example, the peripheral interconnect 207, or the memory bus 203, has one or more connectors to provide the memory sub-system (e.g., 209 or 205) with power and/or communicate with the memory sub-system (e.g., 209 or 205) via a predetermined protocol; and the memory sub-system (e.g., 209 or 205) has one or more connectors to receive the power, data and commands from the processing device 118. For example, the connection between the connector on the peripheral interconnect 207 and the connector on a memory sub-system (e.g., 209) can utilize a PCIe bus or a SATA bus.

In general, the processing device 118 can execute one or more operating systems to provide services, including acceleration of memory access in which a portion of memory in the computer system is accessed via another portion of memory in the computer system using a paging technique and/or a memory map interface, as further discussed below.

The memory virtualizer 113 can be implemented in a device driver of the memory module 205 to virtualize the memory 221, ..., 223 in the memory module 205. Alternatively, the memory virtualizer 113 can be implemented in a device driver of the storage device 209 to virtualize the memory 223, ..., 225 in the storage device 209.

In some instances, a device driver of the memory module 205 virtualizes not only the memory 221, ..., 223 in the memory module 205, but also similar memory modules coupled to the memory bus 203. Thus, the page swapping controlled by the memory virtualizer 113 can across the memory bus 203 between two memory modules (e.g., 205 and another memory module).

In some instances, a device driver of the storage device 209 virtualizes not only the memory 223, ..., 225 in the storage device 209, but also similar storage devices to the peripheral interconnect 207. Thus, the page swapping controlled by the memory virtualizer 113 can across the peripheral interconnect 209 between two storage devices (e.g., 209 and another storage device).

In a further alternative, the memory virtualizer 113 can be implemented in a device driver of a combination of the memory module 205 and the storage device 209 to virtualize the memory 221, ..., 223, ..., 225 in the memory module 205 and the storage device 209. Thus, the page swapping controlled by the memory virtualizer 113 can across the peripheral interconnect 209 and the memory bus (203) between the memory module 205 and the storage device 209.

In some instances, the memory virtualizer 113 can be implemented in the operating system of the host system 120 and/or a hypervisor of the host system 120.

Figure 3:
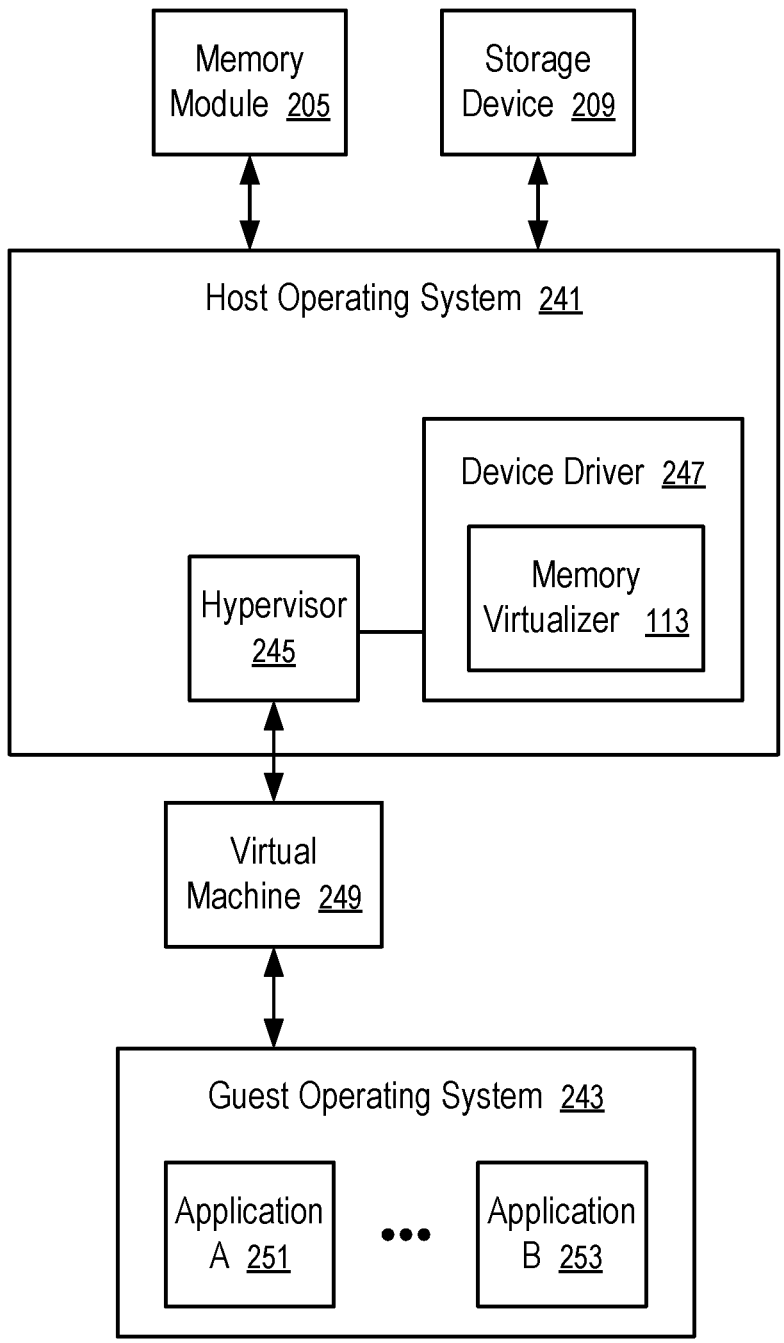
FIG. 3 shows a system having a device driver configured to virtualize memory access made via a hypervisor.

FIG. 3 shows a system having a device driver 247 configured to virtualize memory access made via a hypervisor 245. For example, the system of FIG. 3 can be implemented in a computer system of FIG. 1 or 2.

The system of FIG. 3 includes a host operating system 241 that can run in the processing device 118 of the computer system of FIG. 1 or 2. The host operating system 241 includes one or more device drives (e.g., 247) that provides memory services using the memory (e.g., 221, ..., 223, ..., 225) of memory sub-systems, such as the memory module 205 and/or the storage device 209.

The host operating system 241 includes a hypervisor 245 that provisions a virtual machine 249. The virtual machine 249 has virtual hardware implemented via the resources and services provided by the host operating system 241 using the hardware of the computing system of FIG. 1 or 2. For example, the hypervisor 245 can provision virtual memory as part of the virtual machine 249 using a portion of the memory (e.g., 221, ..., 223, ..., 225) of memory sub-systems, such as the memory module 205 and/or the storage device 209.

The virtual machine 249 allows a guest operating system 243 to provide resources and/or services to applications (e.g., 251, ..., 253) running in the guest operating system 243, in a way as the operating system 243 running on a physical computing machine that has the same or similar set of hardware as provisioning in the virtual machine. The hypervisor 245 manages the mapping between the virtual hardware provisioned in the virtual machine and the services of hardware in the computing system managed by the host operating system 241.

FIG. 3 illustrates an instance in which a virtual machine 249 is provisioned by the hypervisor 245. In general, the hypervisor 245 can provision a plurality of virtual machines (e.g., 249) that can run the same guest operating system 243, or different guest operating systems (e.g., 243). Different sets of users and/or application programs can be assigned to use different virtual machines.

In some instances, the host operating system 241 is specialized to provide services for the provisioning of virtual machines and does not run other application programs. Alternatively, the host operating system 241 can provide additional services to support other application programs, such as applications (e.g., 251, ..., 253).

The device driver 247 can be configured to predict the use of a page of slower memory and uses the memory virtualizer 113 to swap the page into faster memory before the page is actually requested for use by the virtual machine 249. The prediction reduces the time between a request to use the page and the availability of the page in the faster memory by loading and/or transferring the page of data from the slower memory to the faster before the request to use the page, which accelerates the data access of the page.

For example, the slower memory can be the memory 223 in the memory module 205 and the faster memory be the memory 221 in the same memory module 205 (or another memory module connected to the same memory bus 203 as the memory module 205).

For example, the slower memory can be the memory 223 in the storage device 209; and the faster memory can be the memory 223 of the same type in the memory module 205, or the memory 221 in the memory module 205.

For example, the slower memory can be the memory 225 in the storage device 209; and the faster memory can be the memory 223 in the same storage device 209 or another storage device connected to the peripheral interconnect 207, or memory (e.g., 223 or 221) in the memory module 205.

Preferably, the predictive data swapping is performed within a same memory sub-system, such as within the same memory module 205 or the same storage device 209, to avoid or reduce congestion in communication channels connected to the processing device 118, such as the memory bus 203 and/or the peripheral interconnect 207. For example, the data swapping-fetching can be performed to copy data from the slower memory 223 in the memory module 205 to the faster memory 221 in the memory module 205, under the control of a controller 227 in the memory module 205 in response to one or more command, request, or instruction from the device driver 247 and/or memory management unit (MMU) 213. For example, the pre-fetching can be performed to copy data from the slower memory 225 in the storage device 209 to the faster memory 223 in the storage device 209, under the control of a controller 229 in the storage device 209 in response to one or more command, request, or instruction from the device driver 247 and/or memory management unit (MMU) 213.

In one embodiment, the hypervisor 245 not only requests the device driver 247 to access a memory (e.g., 221, ..., 223, ..., or 225) in a memory sub-system (e.g., memory module 205 or storage device 209) but also provides the device driver 247 with information that can be used in making predictions of which pages in the memory (e.g., 221, ..., 223, ..., or 225) are likely to be used in a subsequent time period and which pages in the memory (e.g., 221, ..., 223, ..., or 225) are unlikely to be used in the subsequent time period. Examples of information provided by the hypervisor 245 and used by the device driver 247 to make the predictions include: sequences of pages being used in a prior time period, instances of requests to load pages from the slower memory to the faster memory, content attributes of the pages, ownership attributes of the pages, identifications of users or applications of the pages, an indication of whether pages are accessed in a sequential mode in a virtual machine and/or in a user account, an indication of whether page accesses are in a steady state, an indication whether a page used is associated with a huge page, etc.

A page that is likely to be used can be referred to as a hot page; and a page that is unlikely to be used can be referred to as a cold page. The likelihood of a page being used in the subsequent time period can be referred to as the temperature of the page. The device driver 247 uses the information provided by the hypervisor 245 to predict the temperatures of the pages, adjust the locations of the pages in one or more memory sub-systems to optimize the distribution of the pages in the memory (e.g., 221, ..., 223, ..., or 225) and accelerate data access.

In some instances, a hardware prediction engine with self-learning capability is used by the device driver 247 in making the predictions of the temperatures of the pages.

Figure 4:
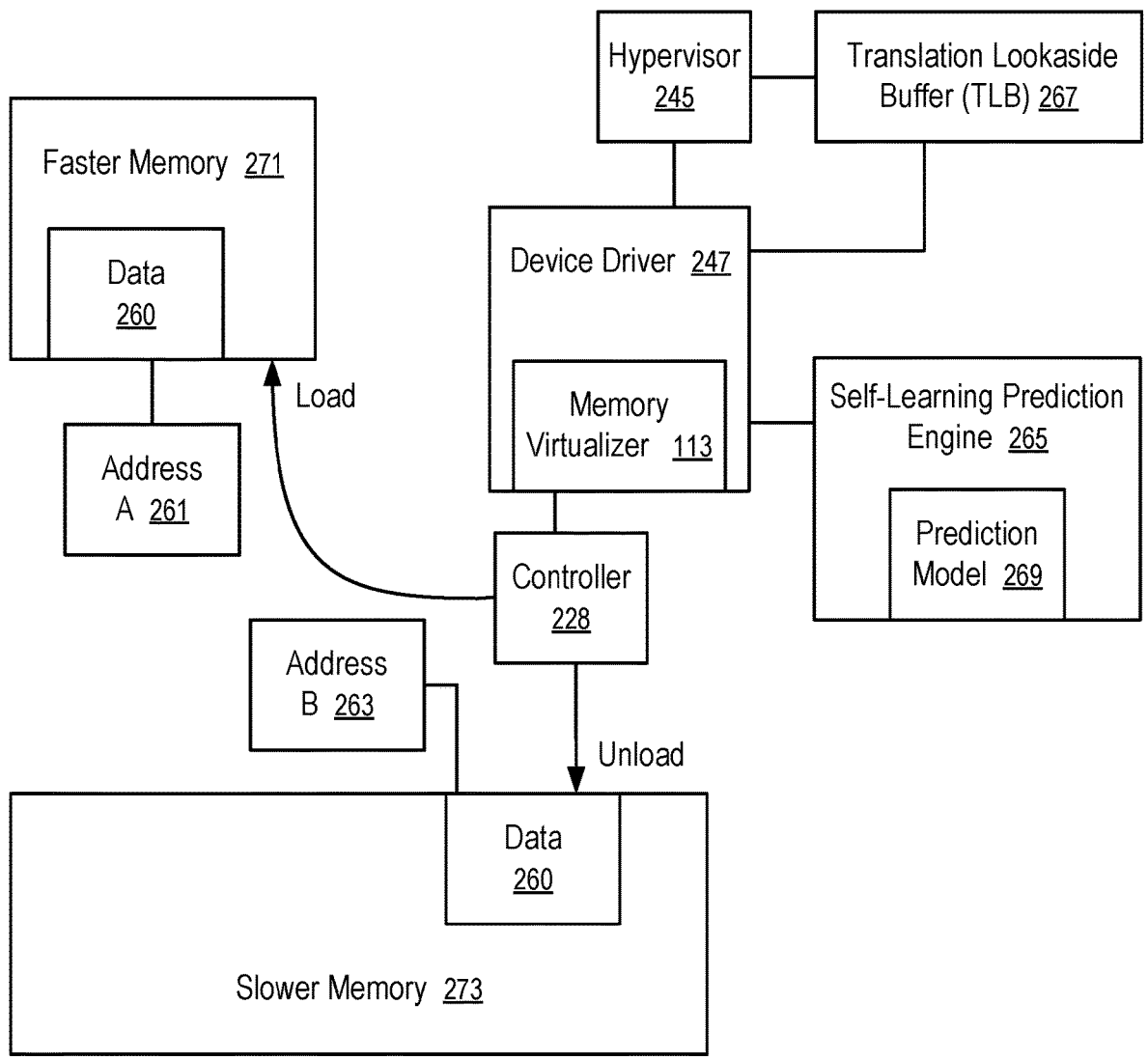
FIG. 4 shows a prediction engine coupled to a device driver to improve memory access through virtualization.

FIG. 4 shows a prediction engine 265 coupled to a device driver 247 to improve memory access through virtualization. For example, the prediction engine 265 of FIG. 4 can be used with the host operating system 241 of FIG. 3 and the memory sub-systems (e.g., 205 and 209) of FIG. 2.

The hypervisor 245 in FIG. 4 is coupled to a translation lookaside buffer (TLB) 267 that defines the mapping between pages of virtual memory provisioned by the hypervisor 245 to the virtual machines (e.g., 249) and the pages in the memory (e.g., 271 or 273).

The processing device 118 can access a page of memory 271 at an address 261 faster than a page of memory 273 at an address 263. It is desirable, and in some instances required, to service the data 260 of a page of the slower memory 273 via a page of the faster memory 271.

When a virtual machine 249 is accessing the data 260 that is in the slower memory 273 but not in the faster memory 271, the hypervisor 245 requests the device driver 247 to load the data 260 from the slower memory 273 to the faster memory 271. The device driver 247 communicates with a controller 228 (e.g., the controller 227 of the memory module 205, the controller 229 of the storage device 229, and/or the memory management unit (MMU) 213) to load the data 260 to the faster memory 271. Once the data 260 is in the faster memory 271, the hypervisor 245 can update the translation lookaside buffer (TLB) 267 to allow the translation of the virtual address of the page to the address 261 of the faster memory 271 such that the data 260 can be read and/or modified in the faster memory 271.

When the data 260 is not being used, the memory virtualizer 113 can unload the data 260 back to the slower memory 273, to save the changes made to the data 260 while the data 260 is being used in the faster memory 271.

The hypervisor 245 provides information to the device driver 247 and/or the self-learning prediction engine 265 to train a prediction model 269 in the prediction engine 265. Such information can include page access history, the identifications of users, programs and/or virtual machines that use the pages, and attributes of pages, such as locality, time, ownership, usage mode, logical relations among the pages (e.g., identifications of pages that are used together to represent an object), the type of data contained in the pages (e.g., operating system, application program, software tool, system data, user data), and/or other meta data of pages.

For example, the prediction model 269 can be constructed using an artificial neural network, or another machine learning model. A supervised machine learning technique can be used to predict the temperatures of the pages in the slower memory 273 and minimize the predicted temperatures and measured temperatures of the pages as indicated in the actual usages of the pages as observed in the hypervisor 245. In some instances, the temperature of a page at a time instance is inversely proportional to the closest subsequent time instance the page is to be used. A time gap to the use smaller than a threshold corresponds to a very hot temperature and thus represents an elevated need or priority for fetching the page to the faster memory 271. A time gap to the use larger than another threshold corresponds to a very cold temperature and thus represents an opportunity to unload the page from the faster memory 271 and make room in the faster memory 271 for other hot pages.

Further, the prediction model 269 can be continuously trained based on the ongoing information about the page usages and the identifications of the actually used pages. The actual usages following the predictions provide feedback regarding the accuracy of the predictions; and the prediction model 269 can be continuously trained to minimize the prediction errors based on the most recent time period of usages.

When the prediction engine 265 identifies a hot page that is not currently in the faster memory 271 and a cold page that is currently in the faster memory 271, the device driver 247 loads the data 260 of the hot page into the faster memory 271 in anticipation of the use of the data 260 and/or unloads the data 260 of the cold page into the slower memory 273 to make room in the faster memory 271 for hot pages.

Optionally or in combination, the prediction engine 265 uses heuristic rules to aid predictive data positioning. The heuristic rules can be based on whether an application or virtual machine is accessing pages of data sequentially or randomly, whether the application or virtual machine is accessing pages of data in a steady state mode or in a bursty mode, whether the application or virtual machine is accessing pages of data through small pages or huge pages, etc.

In some instances, the prediction engine 265 identifies the most frequently used pages of a subsequent time period; and in response, the memory virtualizer 113 instructs the controller 228 to swap pages that are predicted to be the most frequently used to the faster memory 271, while allowing the remaining pages, predicted to be less frequently used, to be accessed from the slower memory 273.

FIG. 4 illustrates the training of the self-learning prediction engine 265 through information provided by a hypervisor 245. In general, the software tool in the host operating system 241 can be used to provide information about the page usage history and/or page information to train the self-learning prediction engine 265 with or without the hypervisor 245. For example, the predictive data fetching technique can be used in an operating system that runs a plurality of application programs but does not have the hypervisor 245 and does not offer virtual machines (e.g., 249).

Preferably, the prediction engine 265 can be implemented using a hardware circuitry separate from the processing device 118 and/or the controllers (e.g., 213, 227, 229, 228). For example, an Application-Specific Integrated Circuit (ASIC) or Field-Programmable Gate Array (FPGA) can be used to implement the prediction engine 265.

Alternatively, the prediction engine 265 can be implemented as a part of the processing device 118, or a processor coupled to the processing device 118.

In some instances, the prediction engine 265 is implemented in the controller 228 of a memory sub-system, such as the controller 227 of a memory module 205 or the controller 229 of a storage device 209.

Figure 5:
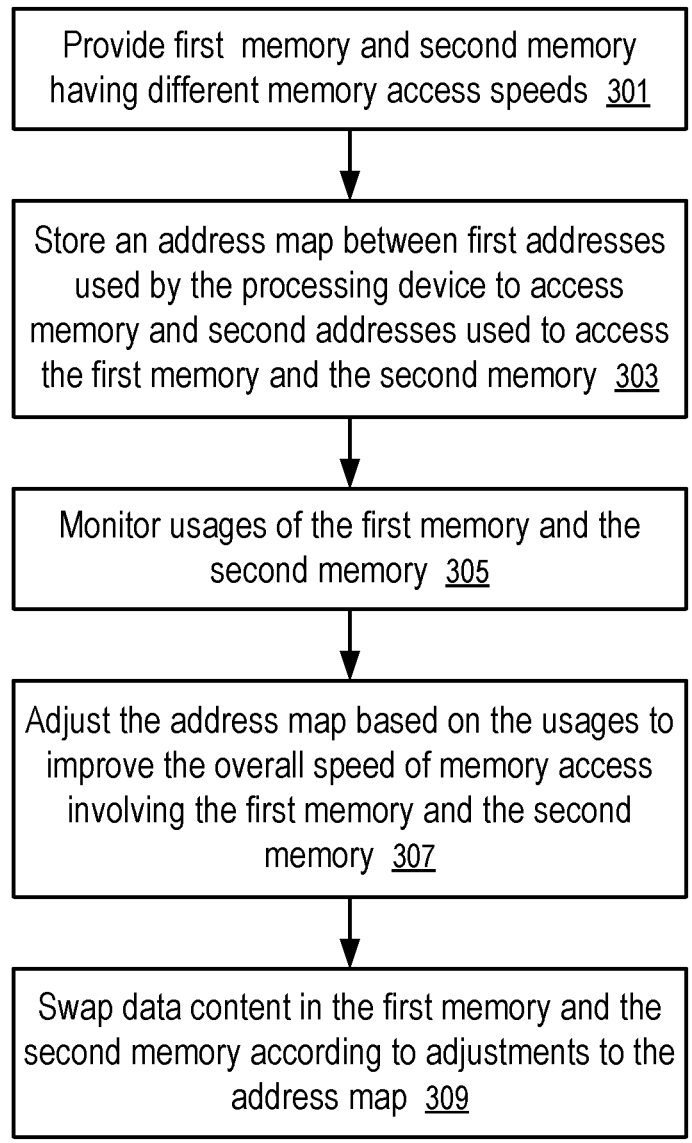
FIG. 5 shows method to virtualize memory access.

FIG. 5 shows method to virtualize memory access. The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by the memory virtualizer 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 5 can be implemented in a computing system of FIG. 1 or 2 with a host operating system 241 of FIG. 3 and a self-learning prediction engine 265 of FIG. 4. For example, the memory virtualizer 113 can be implemented at least in part via the self-learning prediction engine 265 of FIG. 4 and the host operating system 241 of FIG. 3.

At block 301, a computing system (e.g., as illustrated in FIG. 1 or 2) provides first memory (e.g., 109A, 221, or 271) and second memory (e.g., 109N, 223, or 273) having different memory access speeds.

For example, the first memory is faster but volatile (e.g., implemented using DRAM); and the second memory is non-volatile but slower (e.g., implemented using flash memory or cross-point non-volatile memory).

In some instances, the first memory and the second memory are separately accessible in the computing system and/or on a bus (e.g., memory bus 203). However, managing the differences in the first memory and the second memory to full utilizes the different advantages offered by the first memory and the second memory can be a challenge for individual applications (e.g., 251 ..., 253 in FIG. 3) and/or for individual virtual machines (e.g., 249 in FIG. 3). Thus, a memory virtualizer 113 can be provided in the computing system to virtualize the first memory and the second memory and shield the different characteristics of the first memory and the second memory from the applications (e.g., 251 ..., 253 in FIG. 3) and/or virtual machines (e.g., 249 in FIG. 3). For example, the memory virtualizer 113 can be implemented as a device driver of a memory module 205 having the first memory (e.g., 221) and the second memory (e.g., 223) and thus automatically optimizes the usages of the first memory (e.g., 221) and the second memory (e.g., 223) for the current usage patterns of the applications (e.g., 251 ..., 253 in FIG. 3) and/or virtual machines (e.g., 249 in FIG. 3).

At block 303, the memory virtualizer 113 stores an address map between first addresses used by the processing device to access memory and second addresses used to access the first memory and the second memory.

For example, the address map can be stored in the cache memory 211 of the host system 120 or in a dedicated/reserved portion of the first memory. The address map can be stored in the translation lookaside buffer (TLB) (267). For example, the address map defines the relation between the virtual memory addresses used by applications/virtual machines to address memory locations in the memory module 205 and the logical memory addresses transmitted on the memory bus 203 to the memory module 205. Alternatively, the address map defines the relation between the logical memory addresses of the memory module 205 and the physical memory addresses in the memory module 205.

At block 305, the memory virtualizer 113 monitors usages of the first memory and the second memory.

For example, the memory virtualizer 113 can be implemented in a device driver 247 of a memory module (e.g., 205) having the first memory (e.g., 221) and the second memory (e.g., 223). Thus, the usages of the first memory and the second memory are made via the memory virtualizer 113. Past usages and/or current usages can be used to predict future usages in a subsequent period of time. The memory virtualizer 113 can automatically adjusts the distribution of data within the first memory and second memory to fully utilize the different advantages offered by the first memory and the second memory.

At block 307, the memory virtualizer 113 adjusts the address map based on the usages to improve speed of memory access involving the first memory and the second memory.

At block 309, the memory virtualizer 113 swaps data content in the first memory and the second memory according to adjustments to the address map.

For examples, the first memory (e.g., 109A, 221, or 271) is faster than the second memory (e.g., 109N, 223 or 273). Temperatures of pages of data are predicted based on how frequently the pages of data will be used in a subsequent time period. Hotter pages have data that will be used more frequently in the subsequent time period than colder pages. The memory virtualizer 113 instructs the controller 227 of the memory module 205 to swap, adjust, or change storage locations such that hotter pages of data are stored in the faster memory (e.g., 109A, 221, or 271), and colder pages of data are stored in the slower memory (e.g., 109N, 223 or 273). The memory virtualizer 113 adjusts the address map such that the changes are shielded from the applications and/or virtual machines that use the first memory and second memory.

In some implementations, the processing device 118 can access the second memory (e.g., 109N, 223, or 273) over a bus (e.g., 203) without accessing the first memory (e.g., 109A, 221, or 271) at least for a portion of memory access requests processed in the computing system. For example, the frequent access to hotter pages made in the first memory (e.g., 109A, 221, or 271); and the infrequent access to colder pages are made in the second memory (e.g., 109N, 223, or 273). When the performance cost of data swapping is taking into account, swapping colder pages from the slower memory to the faster memory only serve a few infrequent access requests may not improve the overall performance. Thus, the memory virtualizer 113 can avoid such swapping of a colder page to a faster memory and service data access to the colder page directly from the slower memory. In other implementations, the first memory (e.g., 109A, 221, or 271) may be used as cache or gateway for accessing the second memory (e.g., 109N, 223, or 273).

Preferably, the first memory and the second memory are disposed in a same memory module (e.g., 205) and share a common physical host interface to the bus (e.g., 203). Thus, the adjustment of data storage locations within the memory module (e.g., 205) can be performed within the memory module (e.g., 205) without using the communication bandwidth of the memory bus (e.g., 203). Preferably, the memory module (e.g., 205) has a broader communication bandwidth than the memory bus (e.g., 203) for internal data swapping.

Optionally, the memory module (e.g., 205) can be implemented as a dual in-line memory module (DIMM) that includes a controller 227. The controller 227 can implement at least in part the memory virtualizer 113. For example, in response to an instruction from the host system 120, the controller performs internal data swapping to reposition data in different types of memories (221, ..., 223). The memory virtualizer 113 can include a device driver 247 of the memory module (e.g., 205), where the device driver 247 runs in the processing device 118 of the host system 120. Alternatively, the memory virtualizer 113 can be entirely implemented in the controller 227 with hardware and/or firmware.

For example, the memory virtualizer 113 can determinate that data content in the portion of the first memory is accessed less frequently than the portion of the second memory in a subsequent time period. In response to a request to access a memory location currently in the second memory (e.g., 109N, 223, or 273), the memory virtualizer 113 instructs the controller (e.g., 227 or 228) to swap data content between a portion of the first memory (e.g., 109A, 221, or 271) and a portion of the second memory (e.g., 109N, 223, or 273), Thus, the swapping is triggered by the request to access the memory location in the second memory. The controller (e.g., 227 or 228) can service the request before initiating the internal operation of swapping the data content between the portion of the first memory and the portion of the second memory such that the host system 120 can obtain a response to the access request prior to the completion of data swapping.

The memory virtualizer 113 is configured to perform address translation to virtualize memory access. For example, after receiving an address of a memory access request to be made by the processing device 118 of the host system 120, the memory virtualizer 113 converts the address to a converted address based on the address map (e.g., using the translation lookaside buffer 267); The memory virtualizer 113 makes the memory access request on the memory bus 203 according to the converted address.

In some implementations, the first memory (e.g., 109A, 221, or 271) may be used as cache or gateway for accessing the second memory (e.g., 109N, 223, or 273) in a memory module (205) when the second memory is not directly addressable on the memory bus (203). Alternatively, the first memory and the second memory can be in separate memory modules that are coupled to a central processing unit via a same memory bus 203. Alternatively, the first memory and the second memory can be in separate memory systems that are coupled to a central processing unit via separate communication channels.

In some implementations, a communication channel between the processing device 118 and a memory sub-system includes a computer network, such as a local area network, a wireless local area network, a wireless personal area network, a cellular communications network, a broadband high-speed always-connected wireless communication connection (e.g., a current or future generation of mobile network link); and the processing device 118 and the memory sub-system can be configured to communicate with each other using data storage management and usage commands similar to those in NVMe protocol.

A memory sub-system in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller (e.g., 228, 227, or 229) of a memory sub-system (e.g., 205 or 209) can run firmware to perform operations responsive to the communications from the processing device 118. Firmware in general is a type of computer program that provides control, monitoring and data manipulation of engineered computing devices.

Some embodiments involving the operation of the controller 228 can be implemented using computer instructions executed by the controller 228, such as the firmware of the controller 228. In some instances, hardware circuits can be used to implement at least some of the functions. The firmware can be initially stored in the non-volatile storage media, or another non-volatile device, and loaded into the volatile DRAM and/or the in-processor cache memory for execution by the controller 228.

A non-transitory computer storage medium can be used to store instructions of the firmware of a memory sub-system (e.g., 209 or 205) and/or the instructions of the operating system (e.g., 241, 243) in general and the device driver 247 and the hypervisor 245 in particular. When the instructions are executed by the controller 228 and/or the processing device 118, the instructions cause the controller 228 and/or the processing device 118 to perform a method discussed above.

Figure 6:
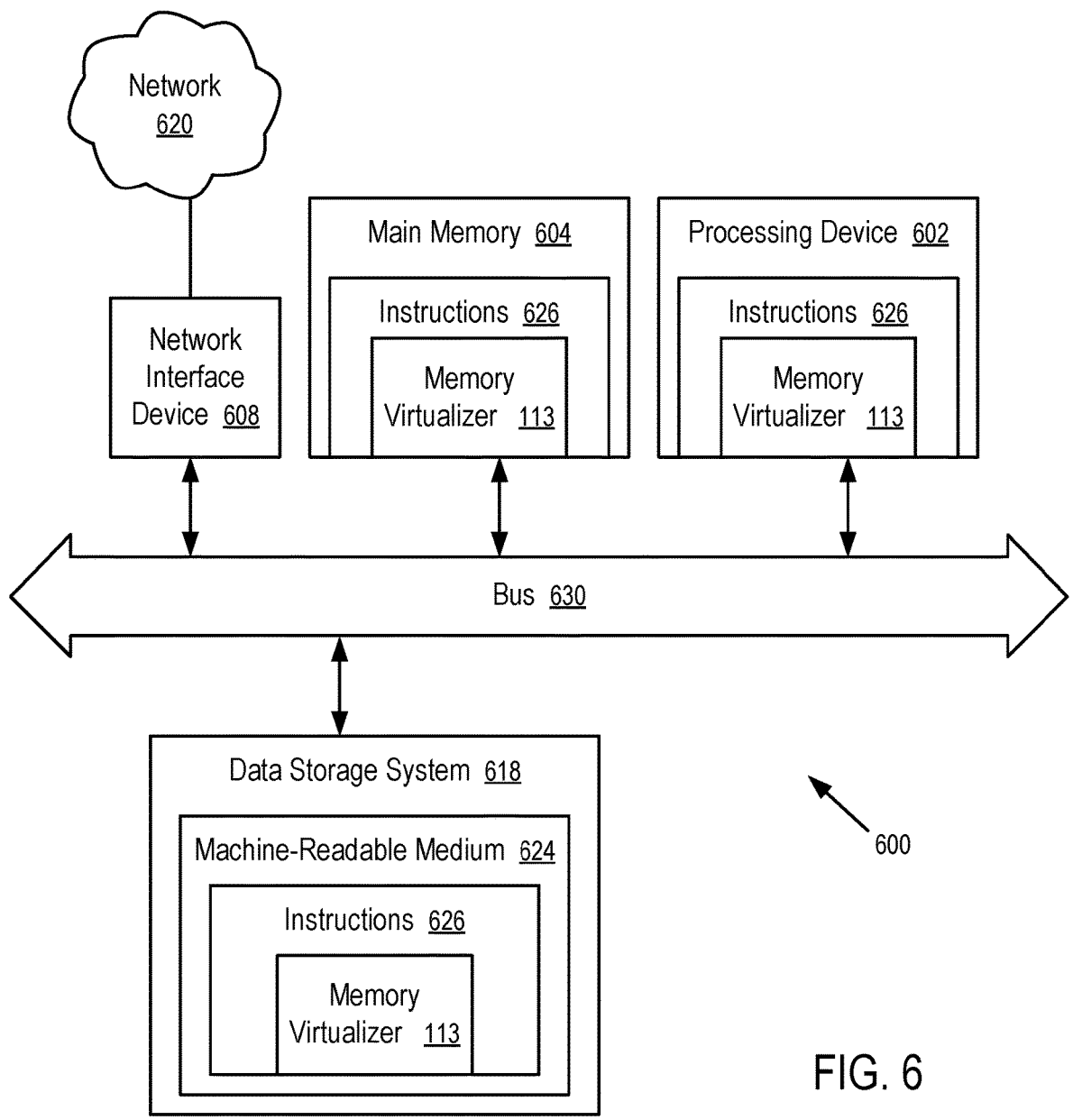
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a memory virtualizer 113 (e.g., to execute instructions to perform operations corresponding to the memory virtualizer 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory virtualizer 113 (e.g., the memory virtualizer 113 described with reference to FIGS. 1-5). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computing system, comprising:
   at least one bus;
   a plurality of memory components, comprising first memory and second memory, wherein the first memory and the second memory have different speeds when accessed via the at least one bus;
   a processing device, operatively coupled with the plurality of memory components through the at least one bus;
   wherein the computing system further comprises a memory virtualizer operatively to:
     store an address map between first addresses used by the processing device to access memory and second addresses used to access the first memory and the second memory;
     monitor usages of the first memory and the second memory, including receiving information related to a use of pages in a slower set of memory, and train a self-learning prediction engine to generate a prediction associated with a use of the pages based on the information;

adjust the address map based on the prediction to improve speed of the processing device in memory access involving the first memory and the second memory; and swap data content in the first memory and the second memory according to adjustments to the address map, wherein characteristics associated with the first memory and the second memory or changes resulting from adjusting the address map based on the prediction are shielded from an application, virtual machine, or a combination thereof, associated with a request to access a memory location currently in the second memory, wherein in response to the request to access the memory location currently in the second memory, the memory virtualizer instructs a controller to swap data content between a portion of the first memory and a portion of the second memory, in response to the prediction via the self-learning prediction engine, that data content in the portion of the first memory is accessed less frequently than the portion of the second memory;

wherein the first memory and the second memory are disposed in a same memory module, and the memory virtualizer comprises a device driver of the memory module running in the processing device.

2. The computing system of claim 1, wherein the first memory is faster than the second memory; and the processing device accesses the second memory over the at least one bus without accessing the first memory for a portion of memory access requests in the computing system.

3. The computing system of claim 1, wherein the first memory is faster than the second memory; and the first memory and the second memory share a common physical host interface to the bus.

4. The computing system of claim 1, wherein the bus is a memory bus; and the memory module is a dual in-line memory module (DIMM).

5. The computing system of claim 4, wherein the memory module includes the controller that implements at least in part the memory virtualizer.

6. The computing system of claim 1, wherein swapping of the data content between the portion of the first memory and the portion of the second memory is performed within the memory module without going through the bus.

7. The computing system of claim 1, wherein the swapping of the data content between the portion of the first memory and the portion of the second memory is performed after accessing the memory location in the second memory.

8. The computing system of claim 4, wherein the device driver runs in the processing device to:
receive an address of a memory access request to be made by the processing device;
convert the address to a converted address based on the address map; and
make the memory access request on the bus according to the converted address.

9. The computing system of claim 4, wherein the memory virtualizer adjusts the address map to place first data in the first memory and second data in the second memory based on a determination that first data is accessed more frequently in a time period than the second data.

10. The computing system of claim 1, wherein the first memory and the second memory are in the same memory module; and at least the portion of the second memory is not directly addressable on the at least one bus.

11. The computing system of claim 10, wherein the first memory is volatile dynamic random-access memory and the second memory is non-volatile cross-point memory.

12. The computing system of claim 1, wherein the first memory and the second memory are in separate memory modules that are coupled to a central processing unit via a same memory bus.

13. The computing system of claim 1, wherein the first memory and the second memory are in separate memory systems that are coupled to a central processing unit via separate communication channels.

14. A method, comprising:
providing a plurality of memory components on at least one bus coupled to a processing device, the plurality of memory components comprising first memory and second memory, wherein the first memory and the second memory have different speeds when accessed via the at least one bus;
storing an address map between first addresses used by the processing device to access memory and second addresses used to access the first memory and the second memory;
monitoring usages of the first memory and the second memory, including receiving information related to a use of pages in a slower set of memory, and training a self-learning prediction engine to generate a prediction associated with a use of the pages based on the information;
adjusting the address map based on the usages to improve speed of the processing device in memory access involving the first memory and the second memory; and
swapping data content in the first memory and the second memory according to adjustments to the address map, wherein characteristics associated with the first memory and the second memory or changes resulting from adjusting the address map based on the prediction are shielded from an application, virtual machine, or a combination thereof, associated with a request to access a memory location currently in the second memory, wherein in response to the request to access the memory location currently in the second memory, swapping data content between a portion of the first memory and a portion of the second memory, in response to the prediction via the self-learning prediction engine, that data content in the portion of the first memory is accessed less frequently than the portion of the second memory;
wherein the first memory and the second memory are disposed in a same memory module, and a memory virtualizer comprises a device driver of the memory module running in the processing device.

15. The method of claim 14, further comprising:
generating, by a hypervisor, information that is used to predict the usages of the first memory and the second memory.

16. The method of claim 15, wherein the information comprises at least one of:
a sequence of pages being used in a period of time;
instances of requests to load pages from the second memory to the first memory;
content attributes of the pages loaded from the second memory to the first memory;
ownership attributes of the pages loaded from the second memory to the first memory;
identifications of users of the pages loaded from the second memory to the first memory;

identifications of applications loaded from the second memory to the first memory;

an identification of pages that are accessed in a sequential mode in the virtual machine;

an identification of pages that are accessed in a sequential mode in a user account; and an identification of page accesses that are in a steady state.

17. A non-transitory computer storage medium storing instructions which, when executed by a computing system having first memory, and second memory provided on at least one bus coupled to a processing device, cause the computing system to perform a method, the method comprising:

storing an address map between first addresses used by the processing device to access memory and second addresses used to access the first memory and the second memory;

monitoring usages of the first memory and the second memory, including receiving information related to a use of pages in a slower set of memory, and training a self-learning prediction engine to generate a prediction associated with a use of the pages based on the information;

adjusting the address map based on the usages to improve speed of the processing device in memory access involving the first memory and the second memory; and swapping data content in the first memory and the second memory according to adjustments to the address map, wherein characteristics associated with the first memory and the second memory or changes resulting from adjusting the address map based on the prediction are shielded from an application, virtual machine, or a combination thereof, associated with a request to access a memory location currently in the second memory, wherein in response to the request to access the memory location currently in the second memory, swapping data content between a portion of the first memory and a portion of the second memory, in response to the prediction via the self-learning prediction engine, that data content in the portion of the first memory is accessed less frequently than the portion of the second memory;

wherein the first memory and the second memory are disposed in a same memory module, and a memory virtualizer comprises a device driver of the memory module running in the processing device.

* * * * *